(12) United States Patent
Goings et al.

(10) Patent No.: US 6,369,468 B1
(45) Date of Patent: Apr. 9, 2002

(54) SYSTEM FOR DETECTING THE STATE OF A SWITCH DEVICE

(75) Inventors: James R. Goings, Novi; Michael R. Wheaton, Rochester Hills, both of MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/606,614

(22) Filed: Jun. 29, 2000

Related U.S. Application Data

(62) Division of application No. 09/240,459, filed on Jan. 29, 1999, now Pat. No. 6,140,622.

(51) Int. Cl.[7] .................................................. H02B 1/24
(52) U.S. Cl. ........................ 307/125; 307/112; 340/644; 340/815.45
(58) Field of Search ................................ 307/125, 134, 307/112; 340/815.4, 815.45, 815.52, 644; 219/506; 200/308

(56) References Cited

U.S. PATENT DOCUMENTS

| 2,698,893 | A | | 1/1955 | Ballard |
| 4,007,345 | A | | 2/1977 | Kohler et al. |
| 4,278,856 | A | | 7/1981 | Owens |
| 4,379,973 | A | * | 4/1983 | Turner et al. ............... 307/112 |
| 4,472,610 | A | | 9/1984 | Fuller et al. |
| 4,665,292 | A | | 5/1987 | Payne |
| 4,903,011 | A | | 2/1990 | Reinholm et al. |
| 4,926,025 | A | | 5/1990 | Wilhelm |
| 5,130,518 | A | | 7/1992 | Merle |
| 5,229,579 | A | | 7/1993 | Ingraham et al. |
| 5,250,771 | A | | 10/1993 | Brusasco et al. |
| 5,582,755 | A | | 12/1996 | Maher, Jr. et al. |
| 5,702,624 | A | | 12/1997 | Liao et al. |
| 5,973,418 | A | * | 10/1999 | Ciesielka et al. ........... 307/130 |
| 6,009,369 | A | | 12/1999 | Boisvert et al. |
| 6,020,576 | A | | 2/2000 | Shiah et al. |

* cited by examiner

Primary Examiner—Josie Ballato
Assistant Examiner—Robert L. DeBeradinis
(74) Attorney, Agent, or Firm—Tarolli, Sundheim, Covell, Tummino & Szabo L.L.P.

(57) ABSTRACT

A system (10) for detecting the state of a switch device (60) includes a driver circuit (40) having an output (42) operative to provide a driver output signal. An indicator (44) is electrically connected between the driver circuit (40) and the switch device (60). The indicator (44) is activated in response to the driver output signal and upon the switch device (60) being in a first state. A monitoring circuit (70), which is responsive to the switch device (60) through the indicator (44), is electrically connected to a node (64) between the indicator (44) and the driver circuit (40). The monitoring circuit (70) is operative to provide a first signal in response to the switch device (60) being in the first state and a second signal in response to the switch device (60) being in a second state. The monitoring circuit (70) controls energization of a controller (28) so as to power the controller (28) when the switch device (60) is in the first state. The controller (28) controls the driver circuit (40) and a use device (12) in response to a control switch (26) condition.

14 Claims, 1 Drawing Sheet

SYSTEM FOR DETECTING THE STATE OF A SWITCH DEVICE

CROSS-REFERENCE TO RELATED APPLICATION

This application is a divisional of U.S. patent application Ser. No. 09/240,459, filed on Jan. 29, 1999, now U.S. Pat. No. 6,140,622, issued Oct. 31, 2000.

TECHNICAL FIELD

The present invention relates to a system for detecting the state of a switch device having at least two states.

BACKGROUND

It is desirable to monitor the state of an actuatable switch device in various types of electrical devices. In an automobile, for example, numerous vehicle accessories are responsive to the operative position of a vehicle ignition switch. Typically, a direct connection from the vehicle ignition switch to a monitoring circuit is used to detect whether the vehicle ignition is ON. This conventional approach is illustrated, for example, in U.S. Pat. No. 2,698,893, U.S. Pat. No. 4,926,025, and U.S. Pat. No. 5,229,579. Similarly, U.S. Pat. No. 4,903,011 discloses a lamp drive circuit having a main drive circuit and a separate back-up drive circuit for energizing a lamp through a vehicle ignition switch.

SUMMARY OF THE INVENTION

The present invention is directed to a system for detecting the state of a switch device having at least two states. The system includes a driver circuit having an output operative to provide a driver output signal. An indicator is electrically connected between the driver circuit and the switch device. The indicator is activated in response to the driver output signal and upon the switch device being in a first state. The system also includes a monitoring circuit electrically connected to a node between the indicator and the driver circuit. The monitoring circuit is responsive to the switch device through the indicator. The monitoring circuit is operative to provide a signal in response to the switch device being in the first state and a second signal in response to the switch device not being in the first state. Preferably, the signal from the monitoring circuit is operative to effect energization of a controller which controls operation of associated electrical equipment, including the driver circuit.

BRIEF DESCRIPTION OF THE DRAWING

The foregoing and other features and advantages of the present invention will become apparent to those skilled in the art to which the present invention relates upon reading the following description with reference to the accompanying drawing, in which.

DESCRIPTION OF A PREFERRED EMBODIMENT

Figure 1:
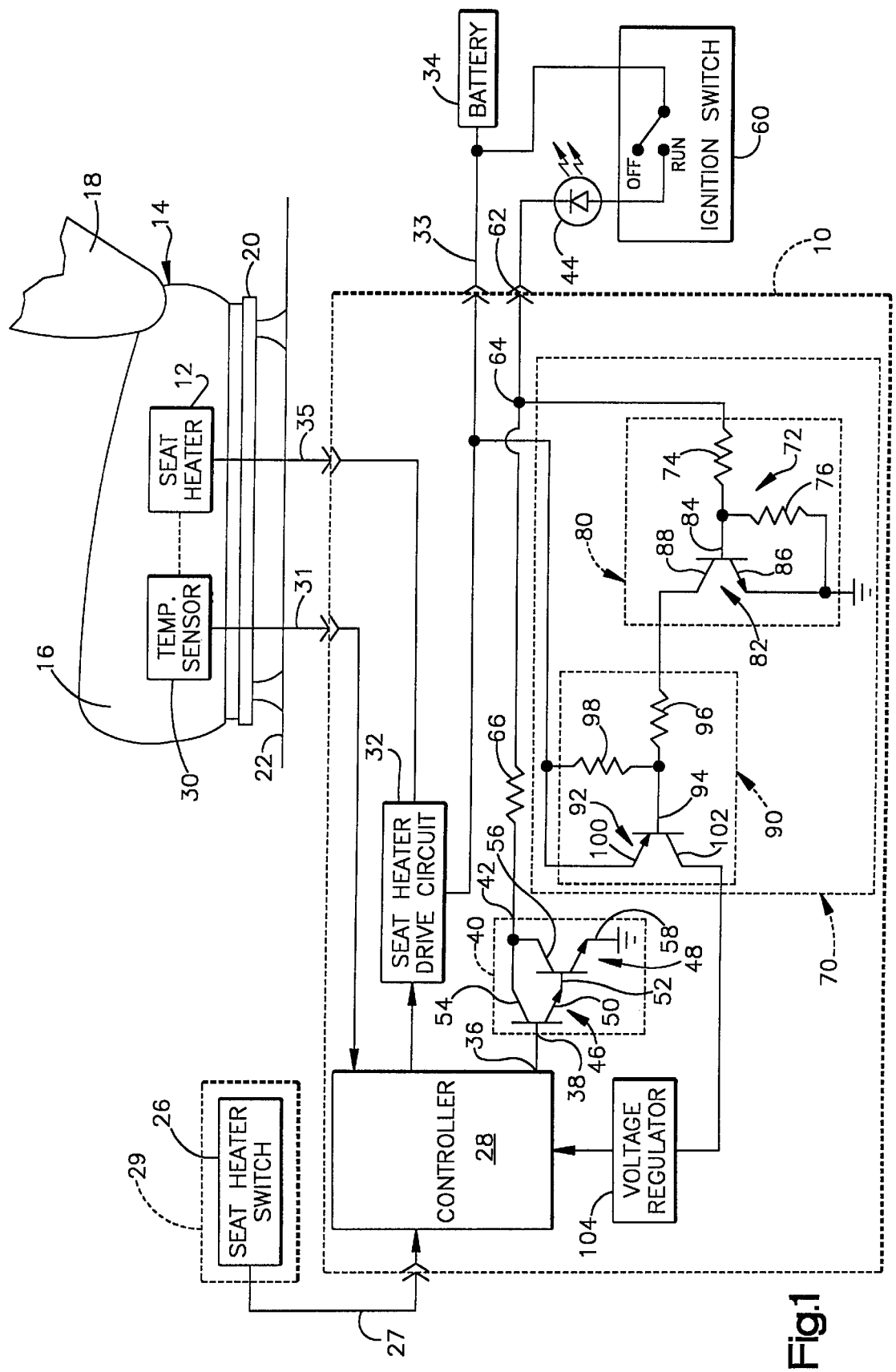
FIG. 1 is a schematic representation of a system in accordance with a preferred embodiment of the present invention.

FIG. 1 illustrates a seat heater control module 10 which is used to control the operation of a seat heater 12 with a switch state detector in accordance with a preferred embodiment of the present invention. The seat heater 12 is mounted to a vehicle seat 14. Specifically, the seat heater 12 is illustrated as being disposed within the cushion 16 of the vehicle seat 14. The seat heater 12 is electrically controlled and may include a resistive heating element, although other types of heating elements may be used. It will be appreciated that the seat heater 12 also might extend within a seat back 18 of the seat 14. The vehicle seat 14 is slidably mounted to a rail 20 in a manner well known in the art. The rail 20 is mounted the floor 22 of the vehicle.

In this preferred embodiment, energization of the seat heater 12 is controlled by a seat heater control switch 26. The control switch 26 is operatively connected to the seat heater 12 through the control module 10. In particular, the seat heater control switch 26 is electrically connected by connection 27 to a controller 28. The seat heater control switch 26 typically is located on the vehicle dash 29 or another convenient location within easy access of the vehicle occupant. The seat heater control switch 26 may simply be an ON/OFF switch. Alternatively, the control switch 26 might be a variable temperature control device, such as a potentiometer, which may be set to a desired temperature manually by the vehicle occupant.

A temperature sensor 30 also is mounted in the vehicle seat 14 adjacent the seat heater 12. The temperature sensor 30 is electrically connected to the controller 28 by feedback connection 31. The temperature sensor 30 provides a temperature feedback signal to the controller 28 indicative of the temperature of the vehicle seat 14. The controller 28, when energized, uses the feedback signal to control the level of electrical energy applied to the seat heater 12.

The controller 28 preferably is microcomputer that includes a microprocessor and suitable memory programmed to control operation of the seat heater 12. The controller 28 also might be formed of discrete components, an application specific integrated circuit, or a combination of discrete components and integrated circuits.

The controller 28 controls energization of the seat heater 12 through a connection to a seat heater driver circuit 32. The seat heater driver circuit 32 is electrically connected to a power supply, such as a vehicle battery 34, which supplies electrical energy through electrical connection 33 to the seat heater driver circuit necessary to energize the seat heater 12. The seat heater driver circuit 32 also is connected to the seat heater 12 through electrical connection 35. Accordingly, the seat heater driver circuit 32 provides electrical energy to energize the seat heater 12 in response to the control signal from the controller 28.

The controller 28 has another output 36 electrically connected with an input 38 of an indicator driver circuit 40. The indicator driver circuit 40 is operative to provide a driver output signal at its output 42 in response to the control signal from the controller 28. The output 42 of the indicator driver circuit 40 is operatively connected to control activation of an indicator 44 in response to the controller 28 receiving an activation signal from the seat heater control switch 26. The driver circuit 40, when activated, connects the output 42 to a voltage level, suitably at electrical ground.

The indicator driver circuit 40 preferably is formed of a Darlington configuration of two NPN transistors 46 and 48. This configuration, in general, increases the current gain of the output stage transistor 48 and reduces the required drive signal needed from the controller 28.

The input stage transistor 46 has a base 38, which defines the input of the driver circuit 40, connected with the output 36 of the controller 28 and an emitter 50 connected with a base 52 of the output stage transistor 48. The collectors 54 and 56 of both transistors 46 and 48 are connected together to form the output 42 of the indicator driver circuit 40. The emitter 58 of the output stage transistor 48 is connected to a low voltage level that is substantially less than the voltage of the battery and preferably is at electrical ground.

The indicator 44 provides an indication to a vehicle occupant that the seat heater 12 is activated. The indicator 44 is electrically connected between the output 42 of the indicator driver circuit 40 and a switch device, which, for example, is a manually activated vehicle ignition switch 60. The vehicle ignition switch 60 has at least two states illustrated as a RUN position and an OFF position. A vehicle ignition switch usually has other operative positions, such as RUN/START and ACCESSORY positions.

In the preferred embodiment, the indicator 44 is a lamp, such as a light emitting diode (LED), although other types of visual or audible indicators may be used. The LED indicator 44 allows current flow through the indicator below the predetermined activation amount without the indicator being activated. The LED indicator 44 has an anode electrically connected to a supply of electrical energy, i.e., the battery 34, through the vehicle ignition switch 60 and a cathode connected to the module 10. The LED indicator 44 also may include a series resistor (not shown).

The indicator 44 preferably is operatively connected with the module 10 through a connector 62 of the module 10. Any suitable electrical connector may be used to connect the cathode of the indicator 44 to the module 10. The connector 62 defines an output of the module 10 and corresponds to an electrical node 64 between the output 42 of the driver circuit 40 and the cathode of the indicator 44.

A current limiting resistor 66 is electrically connected between the output 42 of the indicator driver circuit 40 and the electrical node 64. It will be appreciated that the current limiting resistor 66, alternatively, may be connected between the emitter 58 and electrical ground.

The control module 10 also includes a monitoring circuit 70 which, in accordance with a preferred embodiment of the present invention, determines the state of the vehicle ignition switch 60 by monitoring the voltage level at the electrical node 64. The monitoring circuit 70 is electrically connected to the electrical node 64.

The monitoring circuit 70 preferably includes a resistor network 72 formed of resistors 74 and 76. The resistor network 72 is connected between the electrical node 64 and a voltage level, such as electrical ground, which is substantially less than the expected voltage level at the anode of the indicator 44 while the ignition switch 60 is in the RUN position. The resistor 74 is connected in series with and forms part of a control input for a switch element 80.

Preferably, the switch element 80 is an NPN transistor 82 having a base 84 connected with the electrical node 64 through the resistor 74. The resistor 76 is connected between the base 84 of the transistor 82 and an emitter 86 of the transistor. The emitter 86 of the transistor 82 is electrically connected to a voltage level, preferably electrical ground, which is at a level substantially less than the expected voltage level provided to the anode of the indicator 44 while the ignition switch 60 is in the RUN position.

The transistor 82 also has a collector 88 operatively connected to a second switch element 90. In the preferred embodiment, the switch element 90 is a PNP transistor 92 having a base 94 connected to the collector 88 of transistor 82 through a series resistor 96. Another resistor 98 is connected between an emitter 100 and the base 94 of the transistor 92. The emitter 100 is also electrically connected to a source of electrical energy, preferably vehicle battery 34. The resistance values for resistors 96 and 98 are selected to provide for activation of the transistor 92 when transistor 82 is ON. Suitable resistance values, for example, are 2.7K for resistor 96 and 1.1 K for resistor 98.

The transistor 92 has a collector 102 electrically connected to a voltage regulator 104. The voltage regulator 104 is electrically connected to the vehicle battery through the second switch element 90 when transistor 92 is switched ON. The voltage regulator 104, when connected with the battery 34 through the second transistor 92, provides a desired voltage level, suitably about 5 volts, to the controller 28. The voltage regulator 104 provides power necessary to effect operation of the controller 28. This, in turn, enables to controller 28 to control energization of the seat heater 12 and the indicator driver circuit 40 when the seat heater switch 26 is turned ON.

The monitoring circuit 70 provides switched electrical energy from the battery 34 to the voltage regulator 104 according to the position of the vehicle ignition switch 60. In particular, the transistor 82 of the switch element 80 provides an inverted logic output signal at its collector 88 in response to the position of the vehicle ignition switch 60 (i.e., a LOW true signal). The output signal at the collector 88 controls activation of the second transistor 92. That is, when the ignition switch is in the RUN position, the collector 88 has a low voltage level through its connection to electrical ground. This effects current flow through the resistors 98 and 96 which, in turn, turns ON the transistor 92. On the other hand, when the ignition is in the OFF position, the collector 88 is at a substantially higher voltage level, as provided by the vehicle battery 34 and, therefore, the transistor 92 is turned OFF. When transistor 92 is OFF, the controller 28 is not energized, thereby preventing energization of the seat heater 12.

The voltage level at the electrical node 64 also varies as a function of the position of the vehicle ignition switch 60. In particular, the voltage level at the electrical node 64 is equal to the voltage at the anode of the indicator 44 minus the voltage drop, if any, across the indicator.

When the vehicle ignition switch 60 is in the OFF position, the voltage at the anode of indicator 44 is, in accordance with one embodiment, at electrical ground due to the ground connection through resistors 74 and 76 of the resistor network 72. There will be no voltage drop across the indicator 44 and, consequently, ground potential is provided at the electrical node 64. Accordingly, the first transistor 82 is OFF. Because there is no current draw through the transistor 82, which is required for activation of the second switch element 90, the second transistor 92 also is OFF. This results in the voltage regulator 104 being not energized. Consequently, the voltage regulator 104 does not energize the controller 28. This renders the controller peripheral 28 and its equipment, including the indicator driver circuit 40 and the seat heater driver 32 inactive and non-responsive to the seat heater switch control 26. Under these circumstances, there is no current drawn though the current limiting resistor 66 and, thus, the indicator is not activated, regardless of the condition of the seat heater control switch 26.

When the vehicle ignition switch 60 is in the RUN position, a voltage level substantially equal to that provided by the vehicle battery 34 is applied from the battery 34 to the anode of the indicator 44. The particular voltage level at the electrical node 64 will vary depending upon whether the indicator 44 is biased or unbiased. There is an increased voltage drop across the indicator when biased, such as about 0.7v to about 2.5v. This decreases the voltage level at the electrical node 64 to level that is less than the voltage level provided by the battery 34. Accordingly, the voltage level at the electrical node 64 will be within a predetermined range, ranging from the battery voltage level to a level defined by the battery voltage level minus the drop across the indicator 44.

The forward biasing of the LED indicator 44 varies as a function of the amount of current drawn through the indicator. When the ignition switch 60 is in the RUN position and the indicator driver circuit 40 is not activated by the controller 28, e.g., the seat heater control switch 26 is OFF, the amount of current drawn through the indicator 44 is based on the voltage level provided by the battery 34 and the resistance of the resistor network 72.

The resistance of the resistance network 72 is selected to be sufficiently high so that the current drawn through the indicator 44 and through the resistor network 72 when the switch 60 is in the ON position is insufficient to bias the indicator 44 ON in the absence of the output 42 of the driver circuit 40 being ON. The resistor values for resistors 74 and 76 are selected so that the voltage potential applied to the base 84 of the transistor 82 is sufficient to turn ON the transistor 82 when the switch 60 is in the RUN position. This, in turn, turns ON the transistor 92 to provide electrical power to the voltage regulator 104. This energizes the controller 28 so that it may, in turn, control activation of the indicator driver circuit 40 and the seat heater driver circuit 32 in response to the seat heater control switch 26. Preferably, the switch elements 80 and 90 are formed of suitable digital transistors in which the respective values of the resistors 74, 76 and 96, 98 are easily selected to desired values.

When the seat heater control switch 26 is turned ON while the vehicle ignition switch 60 is in the RUN position, the controller 28 provides an output signal to the input 38 of the indicator driver circuit 40. This, in turn, causes the driver circuit 40 to connect the output 42 to electrical ground. While the output 42 is connected to electrical ground, current is drawn through the current limiting resistor 66 and the driver circuit 40. This results in an increase in the amount of electrical current being drawn through the indicator 44 that is sufficient to forward bias the LED indicator 44 ON.

Because it is desirable only to illuminate the indicator 44 in response to the output signal provided by the indicator driver circuit 40, the values of the current limiting resistor 66 and the resistor network 72 must be appropriately selected. The total resistance of the resistance network 72 is substantially greater than the resistance of the current limiting resistor 66. Preferably, the resistor network 72 has a resistance value that is about an order of magnitude greater than the resistance value of the resistor 66. For example, the resistance of each of the resistors 74 and 76 might be about 10K, with the resistance of the current limiting resistor 66 being at about 680. The functional relationship between the resistance of the current limiting resistor 66 and the resistance of resistor network 72 requires that the indicator 44 be activated only in response to both the ignition switch 60 being in the RUN position and the driver circuit 40 providing an output signal at the output 42 which is substantially at electrical ground. Even with the switch 40 ON and the ignition switch 60 in the RUN position, a sufficient voltage remains at node 64 to keep transistor 82 ON.

The controller 28 activates the indicator driver circuit 40 only when switch 26 is ON and the ignition switch 60 is in the RUN position, as the controller 28 is deenergized when the ignition switch 60 is in the OFF state. The output connection 62 from the indicator driver circuit 40 which drives the indicator 44 is used as an input to control the supply of power to the voltage regulator 104. This advantageously eliminates the need for the controller 28 to accommodate an additional input which also would require a sleep-mode routine. For these reasons, the existing system may be modified in accordance with the present invention without redesigning the controller 28 or costly software modifications.

It further will be appreciated that the vehicle ignition voltage may be monitored through several similarly configured output ports, suitably corresponding to similar indicators for other vehicle accessories. The output ports provide current sinks for the other LED indicators, which have anodes connected through the vehicle ignition switch to the battery voltage level. The cathodes of such indicators are connected to a common node which forms the input to the switch element 80. The common node operates as a logical OR function, so that, if one of the indicators were to fail and become open circuited, the ignition voltage may be sensed through the other indicators.

It also will be appreciated that, in accordance with the present invention, the monitoring circuit 70 might be responsive to other states of the associated switch device 60.

From the above description of the invention, those skilled in the art will perceive improvements, changes and modifications. Such improvements, changes and modifications within the skill of the art are intended to be covered by the appended claims.

Having described the invention, the following is claimed:

1. A system for sensing the state of a switch device having at least two states, said system comprising:
   a driver circuit having an output operative to provide a driver output signal;
   a controller connected to control said driver circuit;
   an indicator electrically connected between the output of said driver circuit and the switch device, said indicator being activated in response to the driver output signal and the switch device being in a first state of the at least two states, and
   a monitoring circuit connected to an electrical node between said indicator and the output of said driver circuit, said monitoring circuit being responsive to the switch device through said indicator, said monitoring circuit being operative to provide a first signal which effects energization of said controller in response to the switch device being in the first state and operative to provide a second signal which effects deenergization of said controller in response to the switch device being in a second state.

2. A system as set forth in claim 1 wherein said controller is connected to said driver circuit and to said monitoring circuit, said controller energizing said driver circuit and, in turn, said indicator only while said monitoring circuit provides the first signal in response to the switch device being in the first state.

3. A system as set forth in claim 2 further comprising a manually activated control switch having at least two states and operatively connected to said controller, said controller controlling operation of said driver circuit in response to the state of said manually activated control switch.

4. A system as set forth in claim 1 wherein said electrical node between the output of said driver circuit and said indicator has a first voltage level within a predetermined range of voltages in response to the switch device being in the first state, said electrical node having a second voltage level, which is not within the predetermined range, in response to the switch device being in the second state, said monitoring circuit being operative to provide a first or second logic signal as a function of the voltage level at said electrical node.

5. A system as set forth in claim 4 wherein said monitoring circuit further includes a resistor network that connects said electrical node to a third voltage level, said resistor network permitting an amount of current draw through said indicator while the switch device is in the first state that is insufficient to energize said indicator in the absence of the driver output signal, said indicator being energized in response to the driver output signal while the switch device is in the first state.

6. A system as set forth in claim 5 further comprising a current limiting resistor electrically connected between the output of said driver circuit and said electrical node, said electrical node being connected to a fourth voltage level through said current limiting resistor and said driver circuit in response to said driver circuit providing the driver output signal, the fourth voltage level being less than the first voltage level, said current limiting resistor having a resistance value which is substantially less than the resistance value of said resistor network, whereby connection of the current limiting resistor to the fourth voltage level provides for an increase in electrical current through the indicator which, in turn, effects activation of the indicator.

7. A system as set forth in claim 6 wherein the third and fourth voltage levels correspond to electrical ground.

8. A system as set forth in claim 5 wherein said monitoring circuit further includes a first switch element operatively connected to said resistor network and to the third voltage level, said first switch element providing an output signal having at least two different values, a first value of the output signal of said first switch element corresponding to the first state of the switch device.

9. A system as set forth in claim 8 wherein said monitoring circuit further includes a second switch element operatively connected to said first switch element of said monitoring circuit, said second switch element being electrically connected to a source of electrical energy and being operative to connect the source of electrical energy with said controller in response to the output signal of said first switch element having the first value.

10. A system as set forth in claim 6 wherein said current limiting resistor has a resistance value which is about an order of magnitude less than the resistance value of said resistor network.

11. A system as set forth in claim 6 wherein said indicator comprises a light emitting diode having an anode connected to the switch device and a cathode operatively connected to said electrical node, said light emitting diode being forward biased in response to the switch device being in the first state and said current limiting resistor being connected to the fourth voltage level.

12. A system as set forth in claim 1 wherein said indicator has a first terminal electrically connected to said electrical node and a second terminal operatively connectable to a voltage potential at a first level through the switch device, said indicator being activated in response to both (i) the switch device being in the first state, which operatively connects the second terminal of said indicator to the first voltage level, and (ii) said driver circuit providing a driver output signal at a second voltage level which is less than the first voltage level.

13. A system as set forth in claim 12 wherein said indicator comprises a light emitting diode having an anode and a cathode, the anode forming the second terminal of said indicator and the cathode forming the first terminal of said indicator.

14. A system as set forth in claim 1 further comprising a manually activated control switch having at least two states and operatively connected to control operation of said driver circuit, said controller being responsive to said manually activated control switch to actuate said driver circuit, provided that the switch device is in the first state.

* * * * *